UNITED STATES PATENT OFFICE.

HUGO GELDERMANN, OF GROSS-LICHTERFELDE-OST, NEAR BERLIN, AND HEINRICH OSTER, OF CHARLOTTENBURG 2, GERMANY, ASSIGNORS TO ACTIEN GESELLSCHAFT FÜR ANILIN FABRIKATION, OF BERLIN, GERMANY.

MONOAZO DYESTUFF FOR CHROME-MORDANTED WOOL.

983,132.   Specification of Letters Patent.   Patented Jan. 31, 1911.

No Drawing.   Application filed October 27, 1909. Serial No. 524,837.

*To all whom it may concern:*

Be it known that we, HUGO GELDERMANN and HEINRICH OSTER, subjects of the German Emperor, residing, respectively, at Gross-Lichterfelde-Ost, near Berlin, and Charlottenburg 2, near Berlin, Germany, and whose post-office addresses are, respectively, Grabenstrasse 12, Gross-Lichterfelde-Ost, near Berlin, and Guerickestrasse 14, Charlottenburg 2, near Berlin, Germany, have invented certain new and useful Improvements in Monoazo Dyestuffs for Chrome-Mordanted Wool, of which the following is a specification.

Our invention relates to the manufacture of a new monoazo dyestuff for wool which is to be used in combination with a chrome-mordant; the new coloring matter produces in this way, generally speaking, a deep and full red shade which possesses a good fastness and is more especially very fast to light.

This new product is obtained by diazotizing a derivative of diaminophenol sulfonic acid of the following general formula:

$$OH : NH_2 : NH.CO.CH_3 : SO_3H = 1 : 2 : 4 : 6$$

and combining the diazo compound thus obtained with 1-phenyl-3-methyl-5-pyrazolone.

The following example may serve to illustrate the invention, the parts being by weight: 30 parts of acetyl diaminophenolsulfonic acid (compare the above formula) are diazotized in the usual manner in an aqueous solution by means of 30 parts of hydrochloric acid of 21° Baumé specific gravity and 7 parts of sodium nitrite. The diazo solution thus obtained is allowed to run while stirring into an aqueous solution of 18 parts of 1-phenyl-3-methyl-5-pyrazolone prepared by means of 14 parts of caustic soda lye of 40° Baumé specific gravity and of 16.5 parts of anhydrous sodium carbonate. The combination occurs at once, most of the dyestuff separating; when the reaction is finished the precipitation of the product is completed by the addition of common salt and the dyestuff is isolated by draining, pressing and drying. The product thus obtained if pulverized forms a red-brown powder dissolving in water to a yellow-red solution, which solution on the addition of concentrated soda-lye or of concentrated liquor ammoniæ turns to yellow, whereas adding concentrated hydrochloric acid or glacial acetic acid changes the color to yellow, the free acid of the dyestuff being separated. In alcohol the new product is only difficultly soluble; in concentrated sulfuric acid it dissolves to a yellow solution which solution on the addition of ice separates the free acid of the dyestuff. The neutral aqueous solution of the product when boiled with zinc-dust is decolorized, the solution assuming afterward a light violet color. This new dyestuff produces on wool when dyed from an acid bath and subsequently treated with an oxidizing chromium compound a deep and full red shade of a good fastness and more especially of a good fastness to light.

It is obvious to those skilled in the art that the present invention is not limited to the foregoing example or to the details given therein.

Having now described our invention and the manner in which it may be performed, what we claim is,—

As a new article of manufacture the new monoazo dyestuff which may be obtained by diazotizing acetyl diaminophenolsulfonic acid $$OH : NH_2 : NH.CO.CH_3 : SO_3H = 1 : 2 : 4 : 6$$

and combining the diazo compound thus obtained with 1-phenyl-3-methyl-5-pyrazolone, which new product produces on wool from an acid bath in combination with a suitable chrome-mordant a deep and full red shade of a good fastness and more especially of a good fastness to light, this new dyestuff being in the shape of the sodium salt if pulverized a red brown powder dissolving in water to a yellow-red solution, which solution on the addition of concentrated soda-lye or of concentrated liquor ammoniæ turns to yellow, whereas adding concentrated hydrochloric acid or glacial acetic acid changes the color to yellow, the free acid of the dyestuff being separated, this new dyestuff being only little soluble in alcohol, but dissolving in concentrated sulfuric acid to a yellow solution which solution on the addition of ice separates the free acid of the dyestuff, and the neutral aqueous solution of the new product when boiled with zinc-dust being decolorized, the solution assuming afterward a light violet color, whereas the dyestuff is split up by the action of stannous chlorid and hydrochloric acid on boiling yielding diaminophenol sulfonic acid besides amido-1-phenyl-3-methyl-5-pyrazolone.

In testimony whereof we have hereunto set our hands in presence of two subscribing witnesses.

HUGO GELDERMANN.
HEINRICH OSTER.

Witnesses:
WOLDEMAR HAUPT,
HENRY HASPER.